United States Patent [19]

Kashima et al.

[11] 4,383,844

[45] May 17, 1983

[54] OPTICAL FIBER FUSION SPLICING METHOD

[75] Inventors: Norio Kashima; Fumihiro Nihei, both of Mito, Japan

[73] Assignee: Nippon Telegraph & Telephone Public Corporation, Tokyo, Japan

[21] Appl. No.: 289,686

[22] Filed: Aug. 3, 1981

[30] Foreign Application Priority Data

Oct. 15, 1980 [JP] Japan .................................. 55-142864

[51] Int. Cl.³ ............................................. C03B 23/20
[52] U.S. Cl. ........................................ 65/4.21; 65/152
[58] Field of Search ......................... 65/4.2, 4.21, 152; 350/96.21

[56] References Cited

U.S. PATENT DOCUMENTS 3,960,531 6/1976 Kohanzadeh et al. ................ 65/4.21

FOREIGN PATENT DOCUMENTS 55-121416 9/1980 Japan .................................... 65/4.21

OTHER PUBLICATIONS

Hatakeyama et al., "Fusion Splices ... By Discharge Heating", Review of the Electrical Comm. Labs., vol. 27, Nos. 7-8, Jul.-Aug. 1979, pp. 532-542.

Primary Examiner—Richard V. Fisher
Attorney, Agent, or Firm—Pollock, Vande Sande and Priddy

[57] ABSTRACT

A method for fusion-splicing aligned optical fibers using heat generated by gas discharge produced between electrodes which are energized by an AC voltage. At first, a high trigger voltage is applied across the electrodes to generate the discharge, after which an AC voltage lower than the trigger voltage is applied across the electrodes to produce steady-state discharge. The AC voltage is selected to satisfy the relation, $10t_O \geq (t_f + t_d + t_r)$, where $t_O$ is the time necessary for ions created by the discharge to flow from one of the electrodes to the other and $t_f$, $t_d$ and $t_r$ are the fall time, the quiescent time and the rise time of the AC voltage. Alternatively, a sine-wave AC voltage is used having a frequency higher than 500 Hz.

8 Claims, 11 Drawing Figures

OPTICAL FIBER FUSION SPLICING METHOD

BACKGROUND OF THE INVENTION

The present invention relates to a method for fusion splicing optical fibers using heat generated by a gas discharge between electrodes.

The optical fiber fusion splicing method employing gas discharge is disclosed, for example, in U.S. Pat. No. 3,960,531 "Method and apparatus for splicing optical fibers" issued June 1, 1976 and has been put to practical use. In the conventional fusion splicing method employing a gas discharge, optical fibers which are to be spliced are aligned end-to-end, and a pair of spaced electrodes are energized to generate an electrical field at the junction between the fibers which is of sufficient magnitude to create a gas discharge or electric arc that melts the ends of the fibers and fuses or splices them together. The power applied across the electrodes is a DC current or an AC current of the commercial power source frequency. For producing a gas discharge, a high voltage, for example, of 3 to 6 KV must be applied across electrodes which are spaced, for example, 1.5 mm apart and, when the discharge starts to effect a flow of current, the voltage between the electrodes drops to a discharge sustain voltage Vg. With the prior art method, a high AC voltage Vsi necessary for starting the discharge is always supplied to the electrodes, and during the discharge the difference voltage between the voltage Vsi and the sustain voltage Vg is produced across a stabilizing resistor connected in series with the discharge electrodes. Accordingly, the conventional method requires a high-voltage transformer for generating the high voltage Vsi at all times and this transformer is bulky and heavy. The power determined by the product of the abovesaid difference voltage, Vsi-Vg, and the discharge current is dissipated by the abovementioned stabilizing resistor and this power is not used for the fusion splice and hence it is wasteful. Since this wasteful power is large, the high-voltage transformer must have a large capacity and consequently the transformer is inevitably bulky and heavy. Further, such useless power dissipation is undesirable especially when the fusion splicing machine operates from a battery. For splicing optical fibers in places which exhibit difficult work conditions, such as a narrow manhole or hand hole and a telephone pole, a splicing machine operating from a small, lightweight battery is desired. With the prior art fusion splicing method, however, it is difficult to realize such a machine.

Heretofore it has been proposed to make the transformer small and lightweight by raising the frequency of the AC voltage, for example, up to between 16 and 60 KHz. In this method, however, the AC voltage of the high frequency is used as the high voltage Vsi for starting the discharge and the AC voltage is supplied to the discharge electrodes at all times, so that much power is wasted by the stabilizing resistor as described above. Accordingly, this method does not provide improvement in power saving.

SUMMARY OF THE INVENTION

It is an object of the present invention to provide an optical fiber fusion splicing method which permits reduction of the size, weight and power dissipation of the fusion splicing machine.

According to the present invention, at the start of discharge a trigger voltage high enough to produce a discharge is applied across the electrodes and, after the discharge is started at least once, a steady-state discharge is produced. In such a state of steady-state discharge, an AC voltage lower than the high trigger voltage is provided across the electrodes. This AC voltage has a waveform that satisfies the relationship, $10t_0 \geq (t_f + t_d + t_r)$, where $t_0$ is the time necessary for ions created by the discharge to flow from one of the electrodes to the other and $t_f$, $t_d$ and $t_r$ are the fall, the quiescent and the rise time of the applied AC voltage. In other words, the parameters are such that discharge may be produced by the next half cycle of the applied AC voltage before the ions existing between the electrodes are extinguished. As a result of this, during the steady-state discharge, even if the applied AC voltage is considerably lower than the trigger voltage, the discharge is effected in each half cycle of the AC voltage. Accordingly, the power consumption by the stabilizing resistor is reduced and the boosting transformer may be small in boosting ratio and power capacity, and hence it can be made small and lightweight. It is preferred that after applying the high trigger voltage, the steady state discharge be effected by a lower AC voltage, and that the frequency of the AC voltage be raised. This will further reduce the size and weight of the transformer. In the present invention, the aforesaid sum, $(t_f + t_d + t_r)$ is selected to be smaller than $10t_0$, preferably, smaller than $2t_0$, and even more preferably, smaller than $t_0$. Moreover, the frequency of the AC voltage is selected to be higher than 1 KHz; in order to eliminate uncomfortable sound, it is preferred that the frequency of the AC voltage be higher than 15 KHz. In the case where the waveform of the AC voltage is sinusoidal, its frequency is selected to be higher than 500 Hz, preferably, higher than 5 KHz, regardless of the aforesaid $10t_0 \geq (t_f + t_d + t_r)$.

DESCRIPTION OF THE PREFERRED EMBODIMENTS

Figure 1:
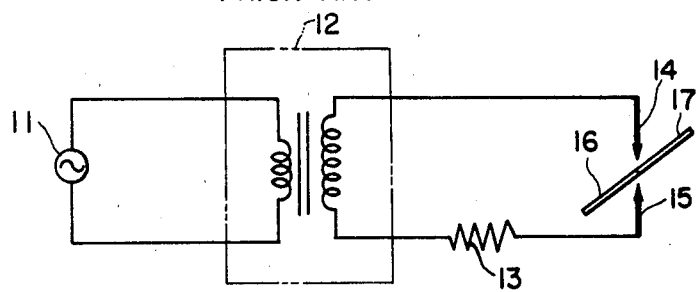
FIG. 1 is a diagram showing an electric circuit for use in a conventional optical fiber fusion splicing method employing gas discharge.

To facilitate a better understanding of the present invention, a description will be given first of a conventional optical fiber fusion splicing method employing AC gas discharge. As shown in FIG. 1, for example, 50 Hz–100 AC voltage from a commercial power source 11 is boosted by a transformer 12 up to about 4 KV and the AC high voltage is applied via a stabilizing resistor 13 across a pair of electrodes 14 and 15 to produce therebetween a discharge. Optical fibers 16 and 17 disposed between the electrodes 14 and 15 are fused together by heat resulting from the discharge.

Figure 2:
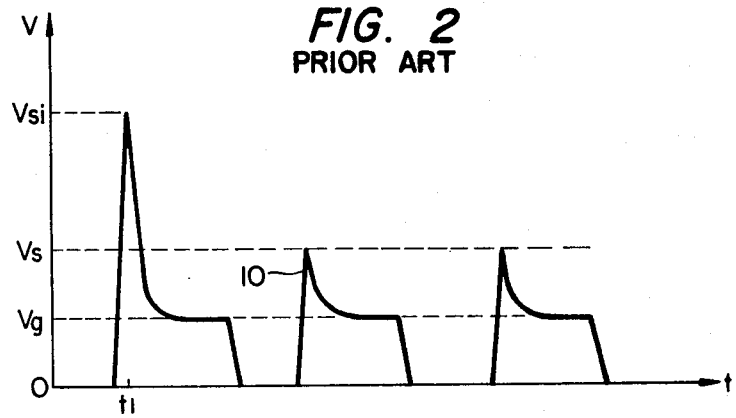
FIG. 2 is a waveform diagram showing inter-electrode voltages in AC discharge.

FIG. 2 schematically shows the voltage characteristic between the electrodes 14 and 15 in this case. In FIG. 2, the abscissa represents time t and the ordinate represents an inter-electrode voltage V, the sign of the voltage being disregarded. In this gas discharge, a high initial spark voltage Vsi is required at the start $t_1$ of a first discharge but, once the discharge is started, the subsequent discharge 10 takes place with a spark voltage Vs lower than the voltage Vsi and thereafter a steady-state discharge is sustained while changing the sign of the inter-electrode voltage in accordance with the applied AC voltage. Before the discharge is started in each cycle of the AC voltage, substantially no current flows and the applied AC voltage appears across the electrodes 14 and 15 but, upon initiation of the discharge, a current flows and, at the same time, the voltage across the electrodes 14 and 15 drops to a constant value, i.e. a discharge sustain voltage Vg, at which a glow discharge occurs. The spark voltage Vs and the sustain voltage Vg of the steady-state discharge and the initial spark voltage Vsi bear the relationship $Vsi > Vs > Vg$.

With the prior art optical fiber fusion splicing method shown in FIG. 1, the high voltage Vsi necessary for the start of discharge is also supplied to the electrodes 14 and 15 during the steady-state discharge, and the voltage across the electrodes 14 and 15 is lowered by the stabilizing resistor 13, having a large resistance value, down to the value Vs at the beginning of each discharge and, further to Vg during the discharge. Letting the resistance value of the stabilizing resistor 13 and the discharge current be represented by R and I, respectively, there holds an expression, $Vsi = Vg + RI$. The power W of the discharge is approximately given as follows:

$$W = Vg \cdot I = Vg \cdot (Vsi - Vg)/R. \qquad (1)$$

The initial spark voltage Vsi and the sustain voltage Vg depend on the spacing d and the configurations of the electrodes 14 and 15. In order to obtain power for splicing quartz optical fibers of 125 to 150 μm in outer diameter, the spacing d of the electrode is 1.5 mm and the resistance value R of the stabilizing resistor 13 is between 100 and 150 KΩ.

With such a method heretofore employed, since the high voltage Vsi is always supplied to the electrodes 14 and 15, a transformer for high voltage generation use is required and, in addition, the resistor 13 must have a large resistance value and hence it consumes much power. Because of the large power consumption, the transformer 12 is required to be large in power capacity. In the conventional optical fiber fusion splice machine, the weight of the power source unit including the high-voltage transformer 12 is about one-half of the overall weight of the machine, and the weight of the transformer 12 exceeds one-half of the weight of the power source unit. Therefore, the transformer 12 is an obstacle to any reduction of the size and weight of the machine. Further, the power that is dissipated by the stabilizing resistor 13 is not used for the fusion splicing, and hence it is entirely wasteful. This power consumption is so large that the conventional machine is poor in efficiency. Especially in the case of operating the fusion splicing machine from a battery, a large-capacity battery is needed; accordingly, the prior art machine is not suitable for use as a handy or portable splicing machine.

According to the present invention, the high voltage Vsi (hereinafter referred to as the high trigger voltage Vsi) is applied only at the start of discharge and the steady-state discharge is sustained by an AC voltage Vs lower than the high trigger voltage Vsi, thereby to perform fusion splicing of optical fibers. If the AC voltage Vs is close to the high trigger voltage Vsi, the present invention is not very advantageous over the prior art method. Accordingly, it is preferred to minimize the value of Vs/Vsi. To this end, in the present invention the waveform of the AC voltage which is applied during the steady-state discharge is selected as follows: Defining the sum of the falling time $t_f$, the quiescent time $t_d$ and the rise time $t_r$ of the AC voltage as a transient time $\hat{t}$, and letting the time for ions created by discharge to flow from one of the electrodes to the other be represented by $t_0$, the waveform of the AC voltage is selected to satisfy the following condition:

$$10 t_0 \geq \hat{t}. \qquad (2)$$

Figure 3:
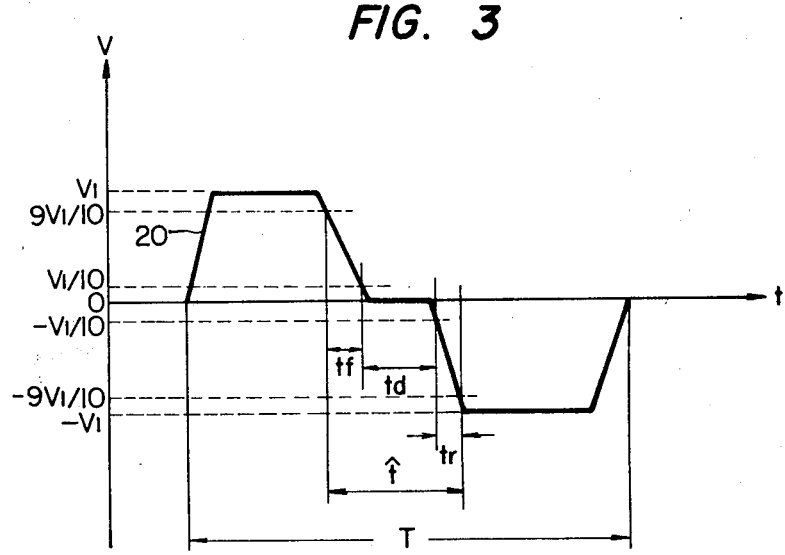
FIG. 3 is a waveform diagram showing the definition of a transient time $\hat{t}$.

FIG. 3 shows the abovesaid times $t_f$, $t_d$ and $t_r$ in connection with a symmetrical waveform of the AC voltage. In FIG. 3, the abscissa represents time t and the ordinate represents voltage V. The time $t_f$ is a time in which the AC voltage waveform 20 falls from 90% to 10% thereof; the time $t_r$ is a time in which the AC voltage waveform 20 rises from 10% to 90% thereof; $t_d$ is a time in which the AC voltage changes from 10% of the peak voltage $V_1$ to 10% of the voltage $-V_1$. In the case of an asymmetrical waveform, a longer one of the periods $(t_f + t_d + t_r)$ of changes from positive to negative and from negative to positive is used as the transient time $\hat{t}$.

Next, a description will be given of the fact that the value of Vs/Vsi is small when the relationship $10 t_0 \geq \hat{t}$ is satisfied.

The time $t_0$ necessary for ions created by a discharge to flow from one of the electrodes to the other is given by the following expression:

$$t_0 = d/v \qquad (3)$$

where d is the electrode spacing and v is the migration velocity of ions. Letting the mobility of ions be represented by μ, the ion migration velocity v is given by the following expression:

$$v = \mu E \qquad (4)$$

where E is an electric field set up by the applied voltage. When calculating the time $t_0$, the sustain voltage Vg shown in FIG. 2 is used as a voltage to be applied. That is, it is determined that $E = Vg/d$ and, accordingly, $t_0 = d^2/(\mu \cdot Vg)$. In an AC discharge, the direction of the applied voltage is reversed every half cycle (T/2) and the direction of migration of ions is also reversed. When the time $\hat{t}$ in which the voltage is reversed is reduced to correspond to the time $t_0$ defined by the expressions (3) and (4), the ions created by the discharge do not follow the change in the electric field set up by the applied voltage, resulting in a space charge layer being formed. This space charge layer acts to decrease the value of Vs/Vsi. The effect of the space charge layer produced by the accumulation of such ions between the electrodes is large, so that the value of Vs/Vsi can substantially be reduced. The reason for which $\hat{t}$ is defined to be smaller than $10t_0$, not $t_0$, is that, in the period $(t_r + t_d + t_f)$, a voltage lower than Vg is applied across the electrodes to cause a decrease in the ion migration velocity v, resulting in an increase in the ion migration time. This will hereinbelow be described based on experimental results.

Figure 4:
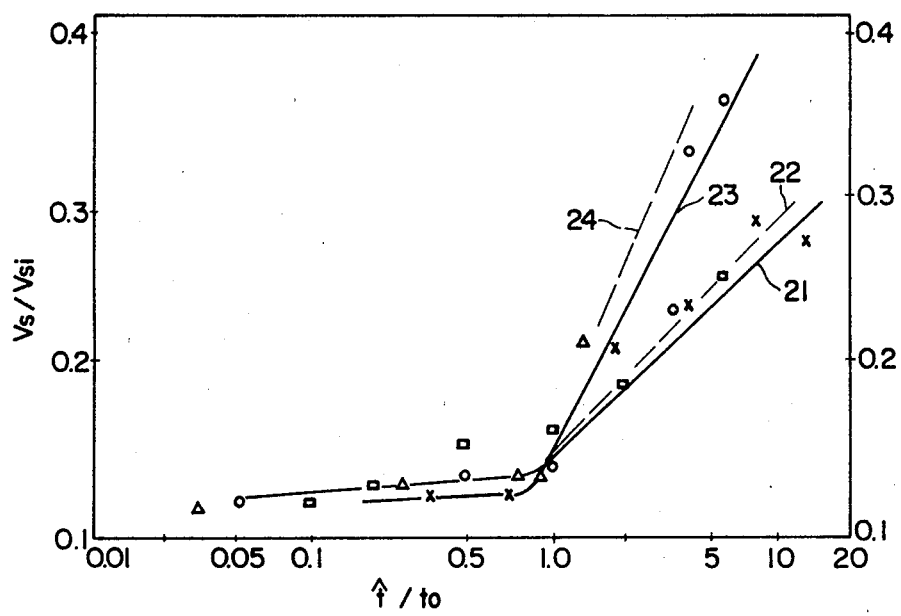
FIG. 4 is a graph showing experimental results on the relation between the transient time $\hat{t}$ and a spark voltage Vs for steady-state discharge.

According to Engel Steenbeck, "Gasentladungen", Springer, 1932, the mobility $\mu$ of ions in the atmosphere is $\mu \simeq 2[cm^2/SV]$ at 273° K. under 1 atm. Calculating the time $t_0$ in the case of d = 1.5 mm based on this value, it is about 20 μsec. The spark voltage Vs for the steady-state discharge was measured with varying transient time $\hat{t}$ using a rectangular wave of a frequency f = 1 KHz for the AC voltage. The experimental results are shown in FIG. 4, in which the abscissa represents the normalized migration time obtained by dividing the transient time $\hat{t}$ by the ion migration time $t_0$, and the ordinate represents the value obtained by dividing the spark voltage Vs by the high trigger voltage Vsi. Curves 21, 22, 23 and 24 (indicated by ×, □, ○ and Δ, respectively) show the cases where the electrode spacing d was 0.5, 1.0, 1.5 and 2.0 mm, respectively. It appears from these curves that the reduction of the transient time $\hat{t}$ will decrease the spark voltage Vs for the steady-state discharge and that if $10t_0 = \hat{t}$, the spark voltage Vs will be less than one-half of the high trigger voltage Vsi even when d = 2.0 mm. In the case of single-fiber splicing, the electrode spacing d is usually selected to be less than 2.0 mm for the purpose of obtaining a stable discharge; from the viewpoint of easy operation of the splicing machine, it is preferred that the electrode spacing is about 1.5 mm. In the case of multi-fiber splicing, the electrode spacing is in the range of 3 to 5 mm. When $2t_0 = \hat{t}$, the value of Vs/Vsi became approximately 0.2 and the spark voltage Vs could be appreciably reduced. With $t_0 = \hat{t}$, Vs/Vsi was nearly equal to 0.1. Even if $\hat{t}$ is further reduced, the value of Vs/Vsi cannot be decreased very much. The experimental results shown in FIG. 4 suggest that the transient time t should be less than $10t_0$, preferably less than $2t_0$, and more preferably less than $t_0$.

Figure 5:
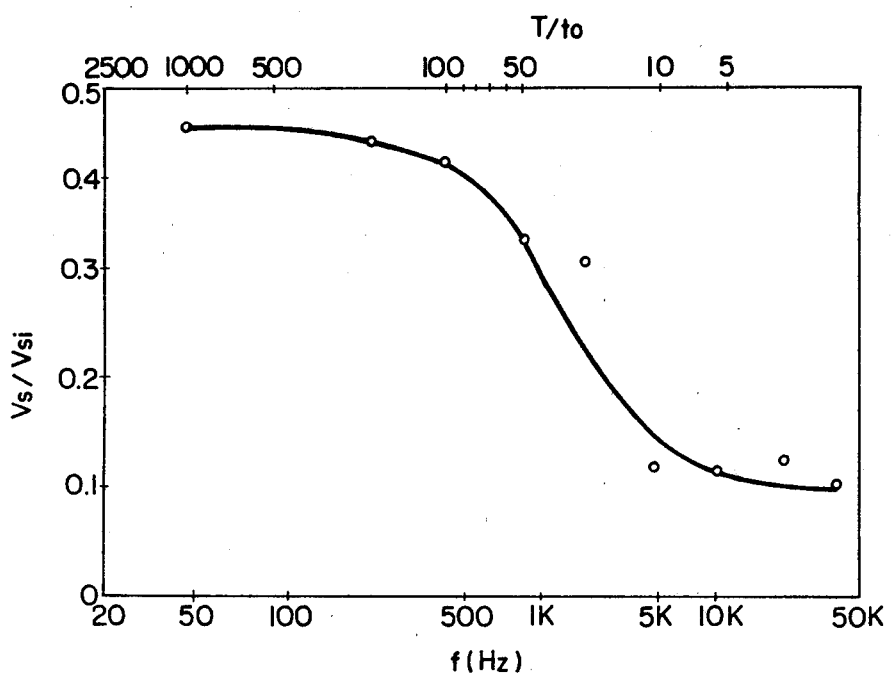
FIG. 5 is a graph showing experimental results on the relation between frequency and the spark voltage for the steady-state discharge.

FIG. 5 shows results of similar experiments conducted where the waveform of the AC voltage was sinusoidal. In FIG. 5, the lower abscissa represents the frequency f, the upper abscissa represents the normalized period $T/t_0$, and the ordinate represents Vs/Vsi. The electrode spacing d was 1.5 mm. It appears from FIG. 5 that the value of Vs/Vsi becomes smaller than 0.4 at 500 Hz ($100t_0$ in terms of the period T) and becomes very small at higher frequencies. In the case of the sine wave, the transient time $\hat{t}$ defined in FIG. 3 is T/3. Accordingly, considering that the transient time $\hat{t}$ is selected to be less than $10t_0$ also in the case of using the rectangular wave, it is sufficient that the period T be less than $30t_0$. However, the experimental results shown in FIG. 5 indicate that the period T may be less than $100t_0$. Accordingly, at the same frequency, it is preferred to employ a sine wave rather than a rectangular wave and this seems to result from the fact that the latter has a considerably larger $t_d$ than that of the former. Further, FIG. 5 shows that the value of Vs/Vsi approaches 1/10 at frequencies higher than 5 KHz and is saturated to about 0.1 at frequencies higher than 10 KHz.

Also in the case of the rectangular wave depicted in FIG. 3, when the frequency of the AC voltage rises, the transient time $\hat{t}$ automatically decreases to reduce the value of Vs/Vsi. In other words, to reduce the value of Vs/Vsi, it is preferred, regardless of the waveform of the AC voltage, to raise the frequency. If the frequency is too high, however, it is difficult, because of stray capacitance and other factors, to construct the machine in a manner to obtain intended characteristics, or the machine cannot be formed using inexpensive parts. Therefore, it is practical at present that the frequency of the AC voltage be lower than 100 KHz.

Figure 6:
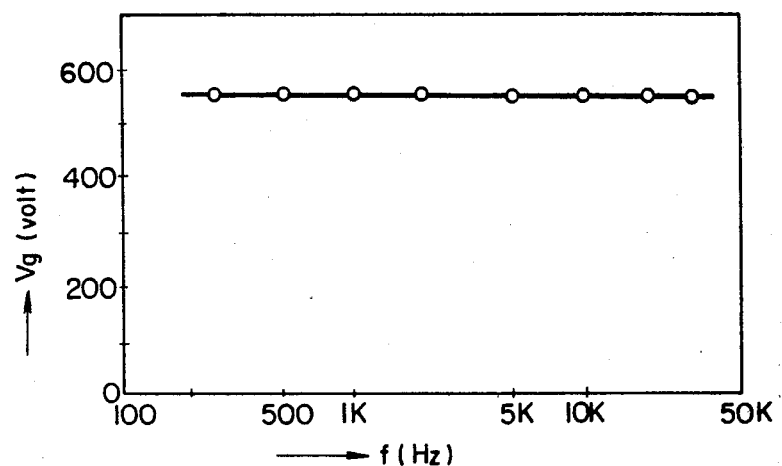
FIG. 6 is a graph showing experimental results on the frequency characteristic of a discharge sustain voltage Vg.
Figure 7:
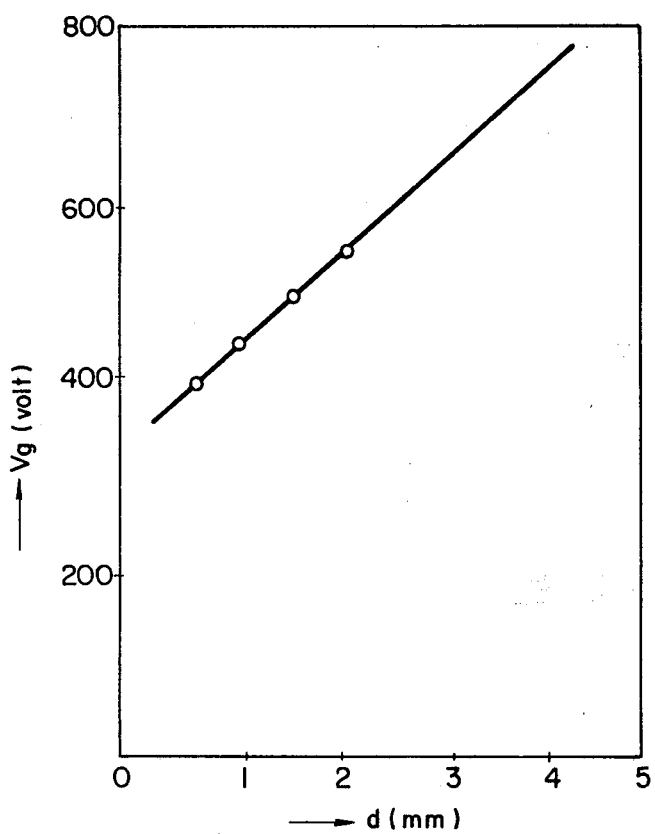
FIG. 7 is a graph showing experimental results on the relation between the discharge sustain voltage Vg and the electrode spacing d.

The high trigger voltage Vsi and the discharge sustain voltage Vg do not depend on the frequency of the AC voltage. For example, as depicted in FIG. 6 which shows the measured value of the frequency characteristic of the voltage Vg with respect to a sine-wave voltage in the case of the electrode spacing d being 1.5 mm, the voltage Vg is constant with respect to the frequency f. The voltage Vg depends on the electrode spacing d. For example, as shown by measured values in FIG. 7, an increase in the electrode spacing d raises the voltage Vg. In FIG. 7, the measurement was conducted at 1 KHz.

Figure 8:
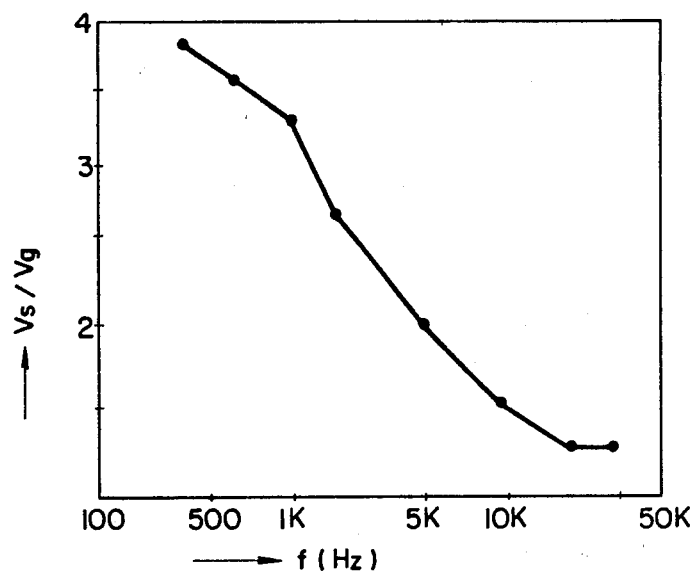
FIG. 8 is a graph showing experimental results on the frequency characteristic of the spark voltage Vs for the steady-state discharge.

FIG. 8 shows the experimental results of the characteristic of the value (Vs/Vg) of the spark voltage Vs normalized by the voltage Vg with respect to the frequency f of the sine-wave AC voltage. The electrode spacing d is 1.5 mm and the value of Vsi/Vg is about 6. The value of Vs/Vg gradually decreases with an increase in the frequency f and becomes nearly equal to 2 at 5 KHz. In the range above 10 KHz the voltage Vs is appreciably close to Vg and, therefore, wasteful power consumption by the stabilizing resistor 13 is markedly diminished.

As described above, wasteful power consumption can be reduced by producing the steady-state discharge using the AC spark voltage Vs lower than the high trigger voltage Vsi after starting discharge by the voltage Vsi and by selecting $10t_0 \geq \hat{t}$ or raising the frequency. Next, a description will be given of reduction of the size and weight of the transformer by decreasing power consumption and raising the frequency.

Letting the overall cross-sectional area of the primary and secondary windings of the transformer, the overall area of a window of a core, the effective cross-sectional area of each core, the magnetic flux density of each core, the permissive current density of the winding, the effective length of the winding and the ratio of occupation by the winding be represented by Ac (m²), Aw (m²), Ae (m²), B (Wb/m²), δ (A/m²), le and β = Ae/Aw, respectively, the power capacity P and the capacity Q of the transformer bear the following relationships:

$$P = 2\beta \cdot B \cdot Ae \cdot Aw \cdot \delta \cdot f \quad (5)$$

and $$Q = Ae \cdot le \approx Ae \sqrt{Aw} . \quad (6)$$

Figure 9:
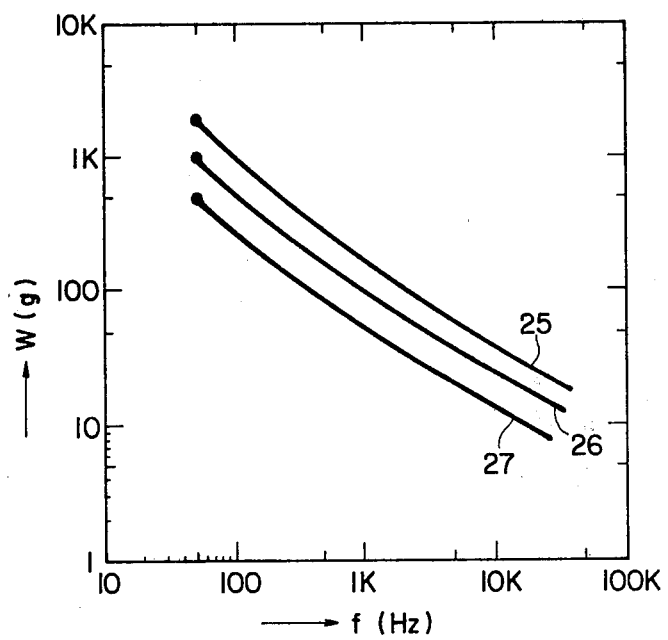
FIG. 9 is a graph showing calculation results of the weight of a transformer allowable with respect to frequency.

Assuming that Aw is proportional to Ae, the capacity Q is in proportion to $\sqrt{Ae^3}$. The power P is proportional to $Ae^2f$, so that if the capacity Q and the weight W are proportional to each other, when the power capacity P is constant, the weight W is in proportion of $f^{-\frac{4}{3}}$. This relation is shown in FIG. 9, where a proportional constant is determined using measured values of a 50 Hz transformer. In FIG. 9 the abscissa represents the frequency f and the ordinate represents the weight W of the transformer. Curves 25, 26 and 27 show the cases where power capacity is 100, 50 and 15 W, respectively. It will be seen from FIG. 9 that an increase in the frequency f will decrease the weight W of the transformer to make it smaller in size, and that the smaller the power capacity is, the more the transformer is reduced in weight and size.

Figure 10:
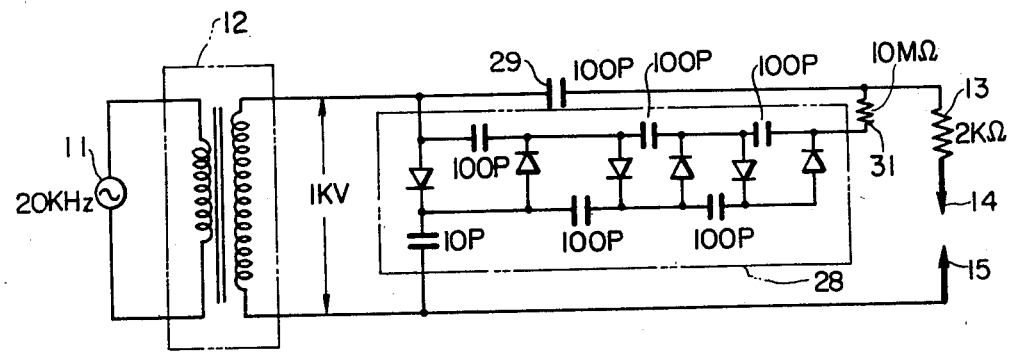
FIG. 10 is a connection diagram illustrating an example of a power source circuit for applying a high trigger voltage and an AC voltage across electrodes.

As described in the foregoing, according to the present invention, the discharge is started by applying the higher trigger voltage Vsi across the electrodes and the subsequent steady-state discharge is sustained by applying the voltage Vs lower than that Vsi. Such a voltage application may be effected, for example, as follows: For example, as depicted in FIG. 10, the output from the transformer 12 is rectified by a DC booster circuit 28 composed of a capacitors and diodes and, at the same time, the rectified output is boosted. One end of the input side of the booster circuit 28 is connected to the one electrode 14 via a capacitor 29 and the stabilizing resistor 13, whereas the other end is connected to the other electrode 15. The output side of the DC booster circuit 28 is connected via a resistor 31 of a large resistance value to the connection point of the capacitor 29 and the resistor 13. The resistor 31 has a resistance value of, for example, 10 MΩ and the stabilizing resistor 13 has a resistance value of 2 KΩ. For instance, the transformer 12 provides at its output a 20 KHz-1 KV voltage, which is rectified by the booster circuit 28 and, at the same time, it is boosted up to six times in this example and charged across the capacitor 29. About 7 KV, which is the sum of the voltage of the capacitor 29 and the output voltage of the primary side of the transformer 12, is applied across the electrodes 14 and 15 and this voltage serves as the high trigger voltage Vsi to produce discharge between the electrodes 14 and 15. Upon occurrence of the discharge, the impedance through the resistor 13 and the discharge gap becomes sufficiently smaller than the impedance of the resistor 31, so that the output AC voltage from the transformer 12 flows through the route [capacitor 29-resistor 13-gap between electrodes 14 and 15] and the DC booster circuit 28 is effectively disconnected from the electrodes 14 and 15. After the discharge between the electrodes 14 and 15 has started, therefore, the 20 KHz-1 KV AC voltage is applied across the electrodes 14 and 15 from the transformer 12, thereby providing the steady-state AC discharge.

Figure 11:
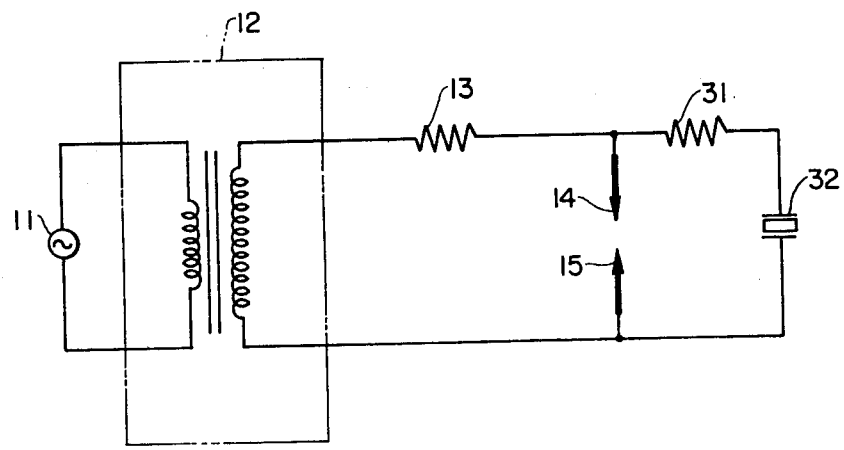
FIG. 11 is a connection diagram illustrating another example of the power source circuit.

An alternative arrangement is shown in FIG. 11. The output from the transformer 12 is applied via the stabilizing resistor 13 across the electrodes 14 and 15 and, at the same time, a piezoelectric high voltage generator 32 is connected across the electrodes 14 and 15 via the resistor 31. The piezoelectric high voltage generator 32 operates instantaneously to create the high trigger voltage Vsi needed to produce discharge between the electrodes 14 and 15. Once the discharge is generated between the electrodes 14 and 15, the steady-state discharge is sustained between them by the 20 KHz-1 KV AC voltage from the transformer 12.

As has been described in the foregoing, according to the optical fiber fusion splicing method of the present invention, discharge is started by the high trigger voltage Vsi and the subsequent steady-state discharge is maintained by the lower AC voltage Vs, whereby the power source unit can be reduced in size and weight and its power consumption can be diminished. In the case where the frequency f of the AC voltage is 20 KHz and the electrode spacing d is 1.5 mm, the value of Vs/Vsi is about 1/10 from the measured value shown in FIG. 5. By such lowering of the voltage Vs as compared with the voltage Vsi and the raised frequency of the AC voltage, the weight of the transformer 12 is decreased to 80 g from 1.6 Kg which is the weight of the transformer in the case where the frequency f of the AC voltage is 50 Hz and the voltage Vsi is applied during the steady-state discharge, too. That is, the weight of the transformer 12 is reduced to 1/20 of that in the prior art, greatly reducing the weight of the power source unit. Furthermore, by making the voltage Vs for the steady-state discharge lower than the voltage Vsi, the resistance value of the stabilizing resistor 13 connected in series with the electrodes 14 and 15 can be decreased. In this example, the resistance value could be decreased from 100 KΩ to 1 KΩ. Accordingly, the power consumption was cut down to 12 W from about 100 W in the prior art. In addition, when graded fibers 50 μm in core diameter and 125 μm in outer diameter were spliced by this machine, the same splice characteristics as those by the prior art were obtained. Moreover, splicing could be achieved in succession more than 90 times using a 12 V, 0.45 Ah Ni-Cd battery.

With the method of the present invention, the power source unit can be made small in size and lightweight and its power consumption is cut down. In addition, the AC voltage Vs for the steady-state discharge can be made close to the sustain voltage Vg to facilitate maintenance of the glow discharge, permitting excellent splicing of optical fibers.

It will be apparent that many modifications and variations may be effected without departing from the scope of the novel concepts of this invention.

What is claimed is:

1. An optical fiber fusion splicing method comprising the steps of aligning optical fibers end-to-end, and fusing said aligned fibers to one another by heating the junction of said fibers by use of heat generated by a gas discharge between electrodes that are disposed adjacent the junction of said fibers and energized by an AC voltage, said electrodes being energized by the steps of:
   applying across the electrodes a trigger voltage high enough to start the discharge; and
   applying across the electrodes an AC voltage lower than the high trigger voltage to produce steady-state discharge after occurrence of the discharge by the high trigger voltage, the AC voltage satisfying the relation $10t_0 \geq (t_f + t_d + t_r)$ where $t_0$ is the time for ions created by the discharge to flow from one of the electrodes to the other and $t_f$, $t_d$ and $t_r$ are the fall time, the quiescent time and the rise time of the AC voltage.

2. An optical fiber fusion splicing method comprising the steps of aligning optical fibers end-to-end, and fusing said aligned fibers to one another by heating the junction of said fibers by use of heat generated by a gas discharge between electrodes that are disposed adjacent the junction of said fibers and energized by an AC voltage, said electrodes being energized by the steps of:

applying across the electrodes a trigger voltage high enough to start the discharge; and applying across the electrodes an AC voltage lower than the high trigger voltage to produce steady-state discharge after occurrence of the discharge by the high trigger voltage, the AC voltage satisfying the relation $2t_0 \geq (t_f + t_d + t_r)$ where $t_0$ is the time for ions created by the discharge to flow from one of the electrodes to the other and $t_f$, $t_d$ and $t_r$ are the fall time, the quiescent time and the rise time of the AC voltage.

3. An optical fiber fusion splicing method comprising the steps of aligning optical fibers end-to-end, and fusing said aligned fibers to one another by heating the junction of said fibers by use of heat generated by a gas discharge between electrodes that are disposed adjacent the junction of said fibers and energized by an AC voltage, said electrodes being energized by the steps of:

applying across the electrodes a trigger voltage high enough to start the discharge; and applying across the electrodes an AC voltage lower than the high trigger voltage to produce steady-state discharge after occurrence of the discharge by the high trigger voltage, the AC voltage satisfying the relation $t_0 \geq (t_f + t_d + t_r)$ where $t_0$ is the time for ions created by the discharge to flow from one of the electrodes to the other and $t_f$, $t_d$ and $t_r$ are the fall time, the quiescent time and the rise time of the AC voltage.

4. An optical fiber fusion splicing method according to claim 1, 2 or 3 wherein the frequency of the AC voltage is selected to be higher than 1 KHz.

5. An optical fiber fusion splicing method according to claim 1, 2 or 3 wherein the frequency of the AC voltage is selected to be higher than 15 KHz.

6. An optical fiber fusion splicing method comprising the steps of aligning optical fibers end-to-end, and fusing said fibers to one another by heating the junction of said fibers by use of heat generated by a gas discharge between electrodes that are disposed adjacent the junction of said fibers and energized by an AC voltage, said electrodes being energized by the steps of:

applying across the electrodes a trigger voltage high enough to start the discharge; and applying across the electrodes a sine-wave AC voltage having a frequency higher than 500 Hz and lower than the high trigger voltage to produce steady-state discharge after occurrence of the discharge by the high trigger voltage.

7. An optical fiber fusion splicing method according to claim 6 wherein the frequency of the AC voltage is selected to be higher than 5 KHz.

8. An optical fiber fusion splicing method according to claim 6 wherein the frequency of the AC voltage is selected to be higher than 15 KHz.

* * * * *